US007351007B2

(12) United States Patent
Ouwinga

(10) Patent No.: US 7,351,007 B2

(45) Date of Patent: Apr. 1, 2008

(54) WATERFALL SPILLWAY

(76) Inventor: David M. Ouwinga, 11073 Peach Ave., Grant, MI (US) 49327

(*) Notice: Subject to any disclaimer, the term of this patent is extended or adjusted under 35 U.S.C. 154(b) by 191 days.

(21) Appl. No.: 11/371,134

(22) Filed: Mar. 8, 2006

(65) Prior Publication Data

US 2007/0212168 A1 Sep. 13, 2007

(51) Int. Cl.
*A01K 63/04* (2006.01)

(52) U.S. Cl. .............. 405/52; 210/170.02; 210/167.01; 405/80

(58) Field of Classification Search ........... 210/167.01, 210/170.02; 405/52, 53, 55, 80
See application file for complete search history.

(56) References Cited

U.S. PATENT DOCUMENTS 5,584,991 A * 12/1996 Wittstock et al. ...... 210/170.02
6,054,045 A * 4/2000 Wittstock et al. ...... 210/170.02
6,290,844 B1 * 9/2001 Tennyson, Jr. ......... 210/170.06
6,461,501 B1 * 10/2002 Porter ................... 210/170.02
6,527,949 B1 * 3/2003 Hedberg et al. ....... 210/170.02
6,709,580 B2 * 3/2004 Ouwinga ............... 210/167.01
6,979,401 B1 * 12/2005 Porter ................... 210/170.09
RE38,989 E * 2/2006 Wittstock et al. ...... 210/170.02
2007/0107664 A1 * 5/2007 Wittstock et al. ........... 119/246

OTHER PUBLICATIONS

Web page from www.pondeco.com, (1 Page), "The Symphony System,", undated.
Web page from www.calpump.com, (2 pages), "Cal Pump—Simple Solutions,", undated.

* cited by examiner

*Primary Examiner*—Frederick L. Lagman
(74) *Attorney, Agent, or Firm*—Price, Henevald, Cooper, DeWitt & Litton LLP

(57) ABSTRACT

A waterfall spillway is provided and has a front wall with a top portion and a bottom portion as well as a back wall substantially parallel with the front wall and having top, central, and bottom portions. A base wall is also included and connects the bottom portion of the front wall with the bottom portion of the back wall. A cavity is formed between the front wall and the back wall. A shelf extends from the top portion of the front wall, and is substantially parallel with the base wall. One or more of the side spillways may also be included.

25 Claims, 5 Drawing Sheets

WATERFALL SPILLWAY

BACKGROUND OF THE PRESENT INVENTION

The present invention relates to a waterfall spillway and the like and in particular to an expandable waterfall spillway having high strength characteristics and a method for making the same.

Waterfall spillways must be versatile and capable of withstanding the pressures associated with continual water flow. These forces are frequently dissipated by the use of rocks, boulders, and aggregate which lessen the force exerted by water as it flows downward.

Many man-made waterfall systems, including polymeric spillways, are designed to allow water to cascade downwardly while providing an aesthetic appearance. Due to their polymeric construction, the size of these waterfall spillways is usually limited due to mold sizing constraints. Oftentimes, polymeric waterfall spillways are not strong enough to withstand seasonal temperature variations as well as the forces imparted on them by the surrounding earth. Consequently, the spillways can fatigue and crack after extensive use. In addition, most synthetically made waterfall spillways are linear in design. This structural limitation inhibits the adaptability of the waterfall spillway to varying terrain.

Accordingly, a waterfall spillway that is durable, expandable, and can be modified to form various shapes and angles is desired and would be an improvement in the art.

SUMMARY OF THE INVENTION

One aspect of the present invention is a waterfall spillway having a front wall with a top portion and a bottom portion as well as a back wall substantially parallel with the front wall and having top, central, and bottom portions. A base wall is also included and connects the bottom portion of the front wall with the bottom portion of the back wall. A cavity is formed between the front wall and the back wall. A shelf extends from the top portion of the front wall, and is substantially parallel with the base wall.

Another aspect of the present invention is a system of waterfall spillways having a first central spillway with front, back, and base walls that form a cavity. A central abutment wall is included and is substantially perpendicular to the front, back, and base walls. A first side spillway has a side abutment wall that is proximate the central abutment wall of the first central spillway, and an outside wall substantially perpendicular with and connected to the front and the back walls of the side spillway. A top portion of the outside wall has a downwardly facing lip.

Yet another aspect of the present invention is a method of making a waterfall spillway system that includes providing a first central spillway having a front wall, a base wall, a back wall, a first end and a second end. The front wall has a shelf projecting outwardly away from the back wall. A first side spillway is provided and has a front wall, a base wall, a back wall, an open end and a containment end. The front wall has a shelf projecting outwardly from the back wall. The first end of the first central spillway is placed alongside the open end of the first side spillway.

The present invention provides a versatile waterfall spillway that is aesthetically pleasing, and can have different lengths and shapes. The waterfall spillway is versatile because an infinite number of walls can be added to the core segment, and the walls can be arranged to form various shapes. Additionally, the improved structure of the spillway lessens the likelihood that the spillway will break or fracture because of the stresses associated with water flow or forces applied by the surrounding earth.

These and other features, advantages and objects of the present invention will be further understood and appreciated by those skilled in the art by reference to the following specification, claims, and appended drawings.

DETAILED DESCRIPTION OF PREFERRED EMBODIMENTS

Figure 1:
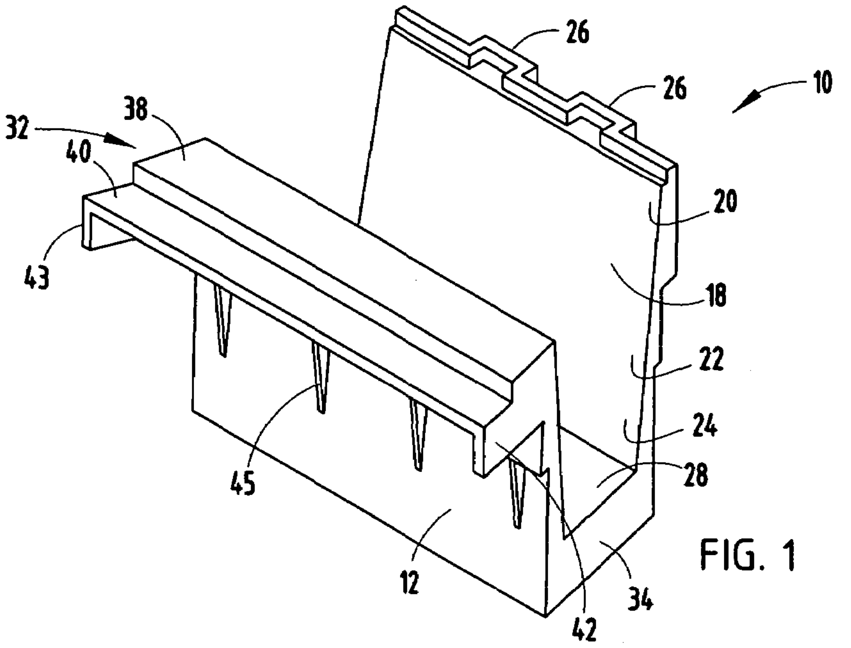
FIG. 1 is a perspective view of an embodiment of a central spillway of the present invention.
Figure 2:
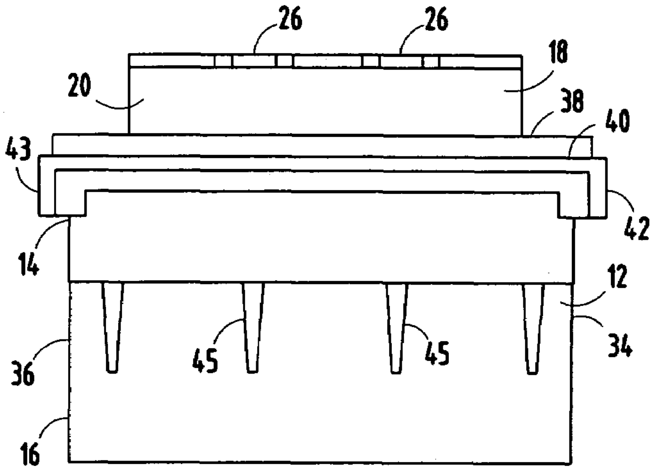
FIG. 2 is a front elevational view of the central spillway of FIG. 1.

For purposes of description herein the terms "upper", "lower", "right", "left", "rear", "front", "vertical", "horizontal" and derivatives thereof shall relate to the invention as oriented in FIG. 2. However, it is to be understood that the invention may assume various alternative orientations and step sequences, except where expressly specified to the contrary.

It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-6, the reference numeral 10 generally designates a waterfall spillway embodying the present invention, which is designed for use in landscaping. The term "waterfall spillway," as used herein, refers to a water cascade for landscaping designs and is intended to incorporate all such, and similar components. Waterfall spillway 10 has a front wall 12 having a top portion 14 and a bottom portion 16. A back wall 18 is substantially parallel with the front wall 12 and has top portion 20, central portion 22, and bottom portion 24. The top portion 20 of the back wall 18 has protrusions 26 that project outwardly therefrom.

A base wall 28 connects the bottom portion 16 of the front wall 12 with the bottom portion 24 of the back wall 18. This structure defines a channel 30 between the front wall 12 and the back wall 18. A shelf 32 extends from the top portion 20 of the front wall 12, which is substantially parallel with the base wall 28. The channel 30 is designed to hold rocks, stones or other large aggregate.

The waterfall spillway 10 also has two abutment walls 34, 36 on either end of waterfall spillway 10 and that are substantially perpendicular with the base wall 28. The shelf 32 includes an upper shelf 38 and a lower shelf 40 in a stair step type configuration with the lower shelf 40 extending parallel with and below the upper shelf 38 which extends from the front wall 12. A flange 42 extends from wall 34 and connects the wall 34 to the upper shelf 38 and lower shelf 40. Similarly, a flange 43 extends outwardly from the wall 36 to the upper shelf 38 and lower shelf 40.

The protrusions 26 project outwardly from a top portion 20 of the back wall 18. The protrusions 26 and flanges 42, 43 make the structure more rigid and less vulnerable to stresses associated with water flow and forces exerted by surrounding earth after the waterfall spillway 10 is installed.

Figure 3:
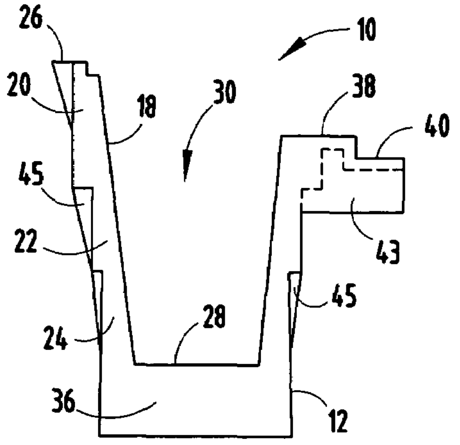
FIG. 3 is a side elevational view of the central spillway of FIG. 1.
Figure 4:
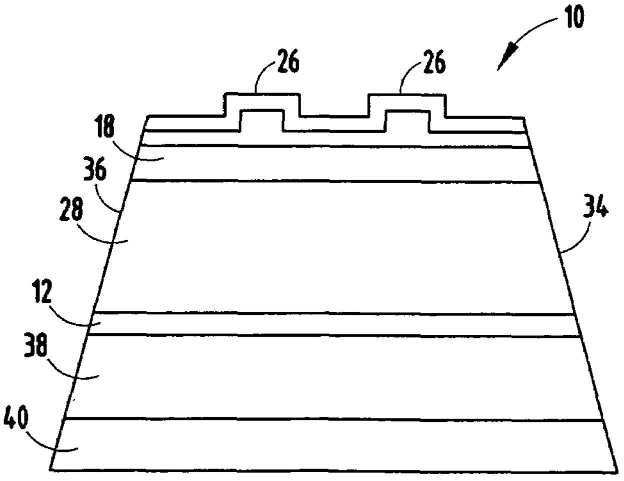
FIG. 4 is a top plan view of the central spillway of FIG. 1.

Referring to FIG. 3, the front wall 12 and the back wall 18 may be tilted slightly outward to allow easier addition and removal of aggregate from the channel 30. Wall supports 45, located on an external face of the back wall 18 and an external face of the front wall 12, also assist in maintaining the structural integrity of the waterfall spillway 10 and support the walls 12, 18 against forces exerted by the surrounding earth as well as forces exerted by water on the waterfall spillway 10.

Figure 5:
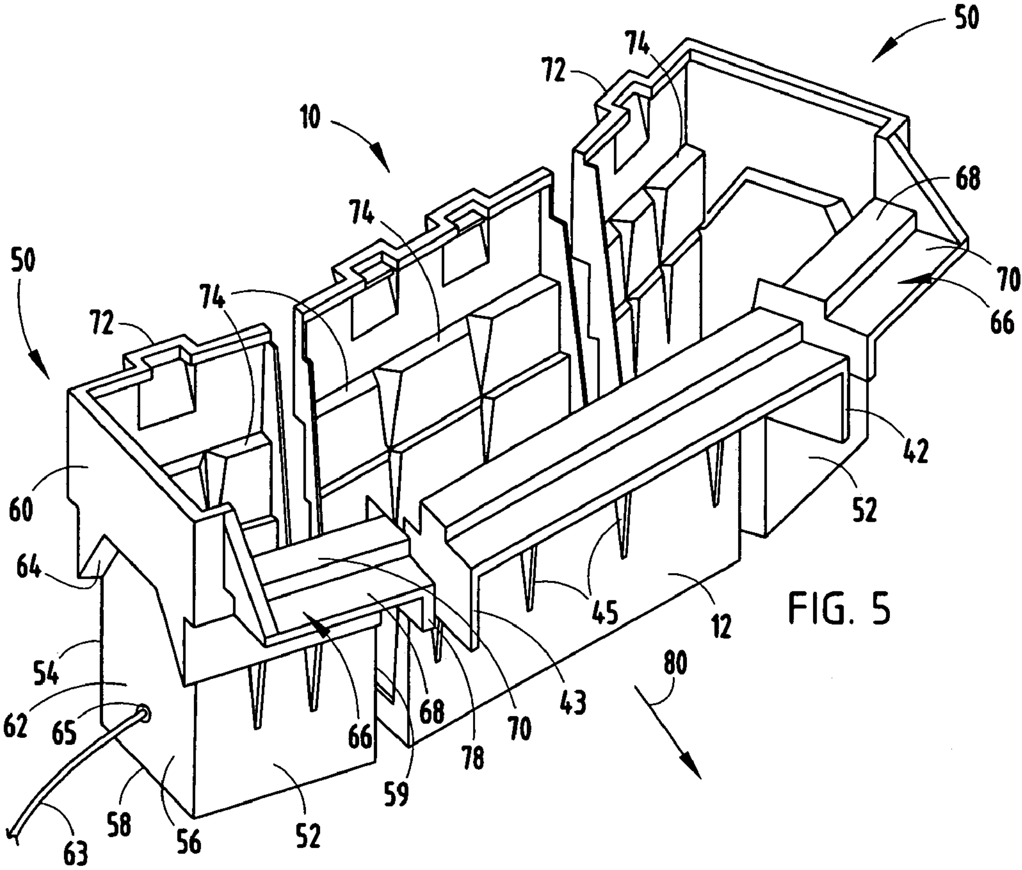
FIG. 5 is a perspective view of the central spillway of FIG. 1 and unattached side spillways.
Figure 6:
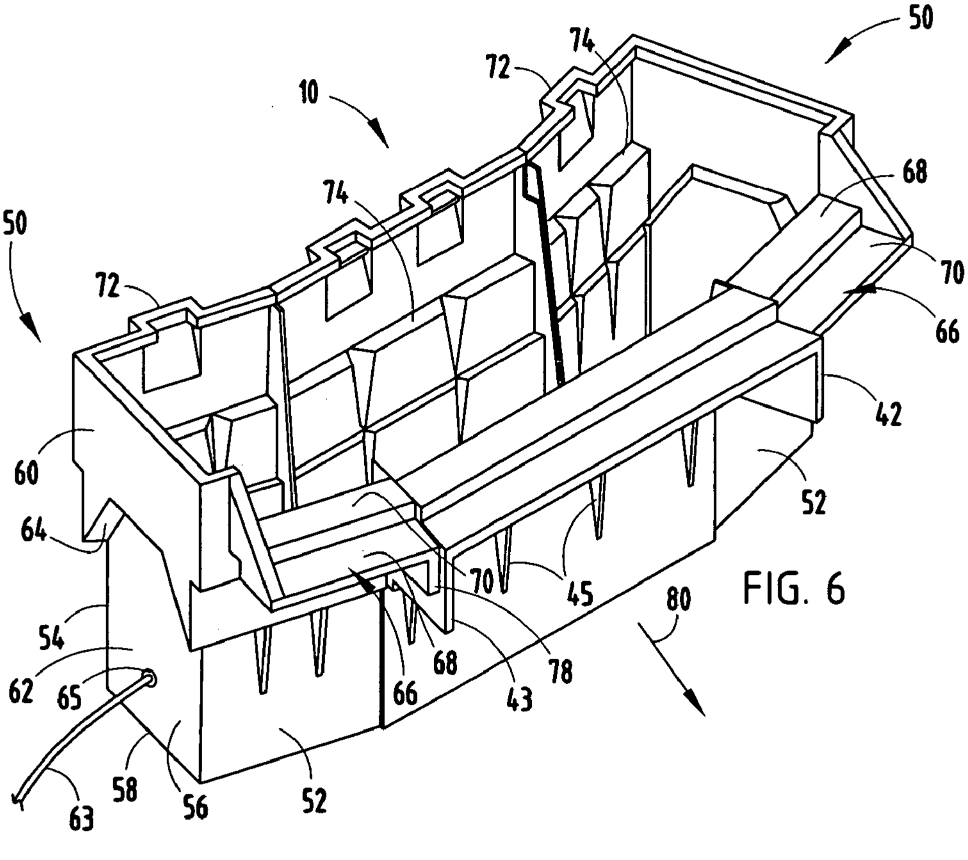
FIG. 6 is a perspective view of the central spillway of FIG. 1 adjacent to side spillways.
Figure 7:
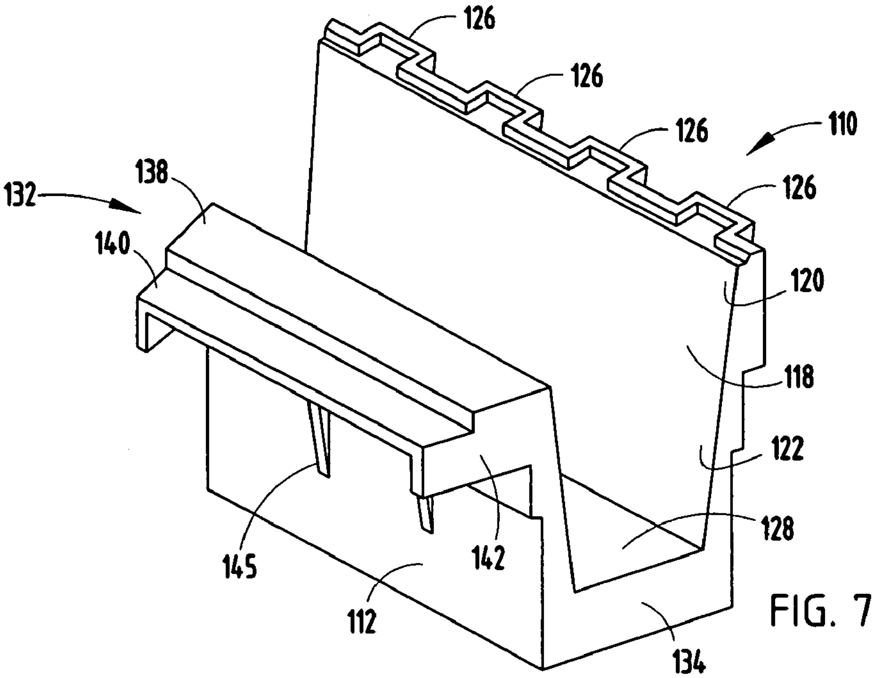
FIG. 7 is perspective view of a second embodiment of a central spillway of the present invention.
Figure 8:
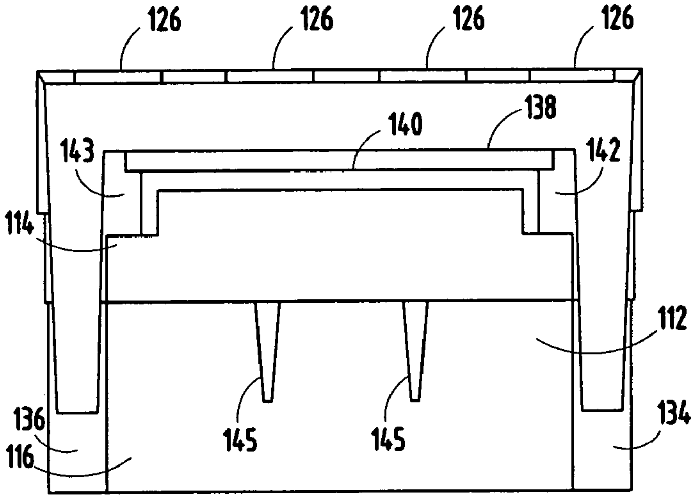
FIG. 8 is a front elevational view of the central spillway of FIG. 7.
Figure 9:
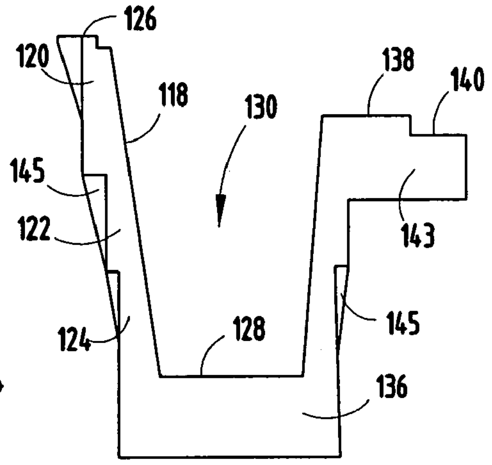
FIG. 9 is a side elevational view of the central spillway of FIG. 7.
Figure 10:
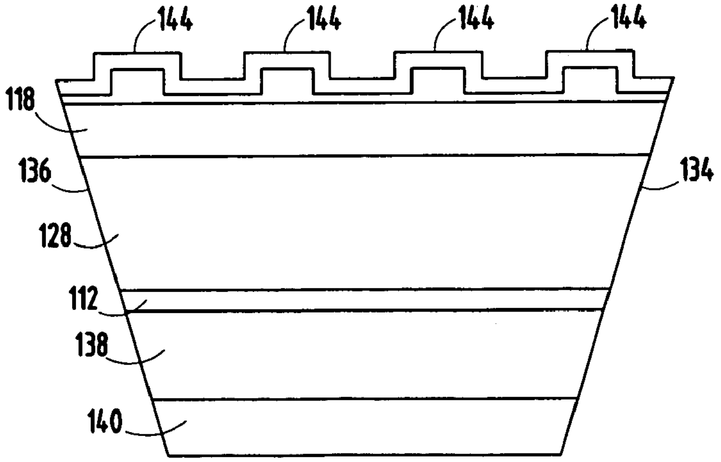
FIG. 10 is a top plan view of the central spillway of FIG. 7.

FIGS. 5 and 6 illustrate the waterfall spillway 10 shown in FIGS. 1-4, with the addition of side spillways 50 adjacent thereto. The side spillways 50 have a front wall 52, a back wall 54, and an outside wall 56 as well as a base 58 that connects the front wall 52, back wall 54 and outside wall 56. The outside wall 56 has a top portion 60 and a bottom portion 62. The top portion 60 protrudes outwardly beyond the planar extent of the bottom portion 62 to create a downwardly facing lip 64. The bottom portion 62 has a hose 63 connected with an aperture 65 in the bottom portion 62. The hose 63 supplies water to the system so that it will cascade over the shelf 32 and down the surrounding terrain. The downwardly facing lip 64 increases stability when the waterfall spillway 10 and side spillways 50 are installed into the surrounding landscape. An open end 59 is on an opposing end from the outside wall 56.

Similar to and at the same height as the waterfall spillway 10, the side spillway 50 has a shelf 66. Shelf 66 includes an upper shelf 68 and lower shelf 70. A top protrusion 72 projects outwardly from the top of the back wall 54. Also, as shown in FIGS. 5 and 6, wall projections 74 are optional and may be included in a central portion of the back wall 54. The wall projections 74 jut inwardly toward the front wall 52 or outwardly away from the front wall 52. In addition, the side spillways 50 have flanges 78 adapted to abut flanges 42, 43 of the central spillway 10, thereby creating a functional unit. The side spillways 50 may be mechanically connected to the central spillway 10 or simply abut the central spillway 10. FIGS. 5 and 6 illustrate a convex architecture that disperses and widens water flow as it flows from the back wall 18 to the front wall 12 in the direction of the arrow 80.

Figure 11:
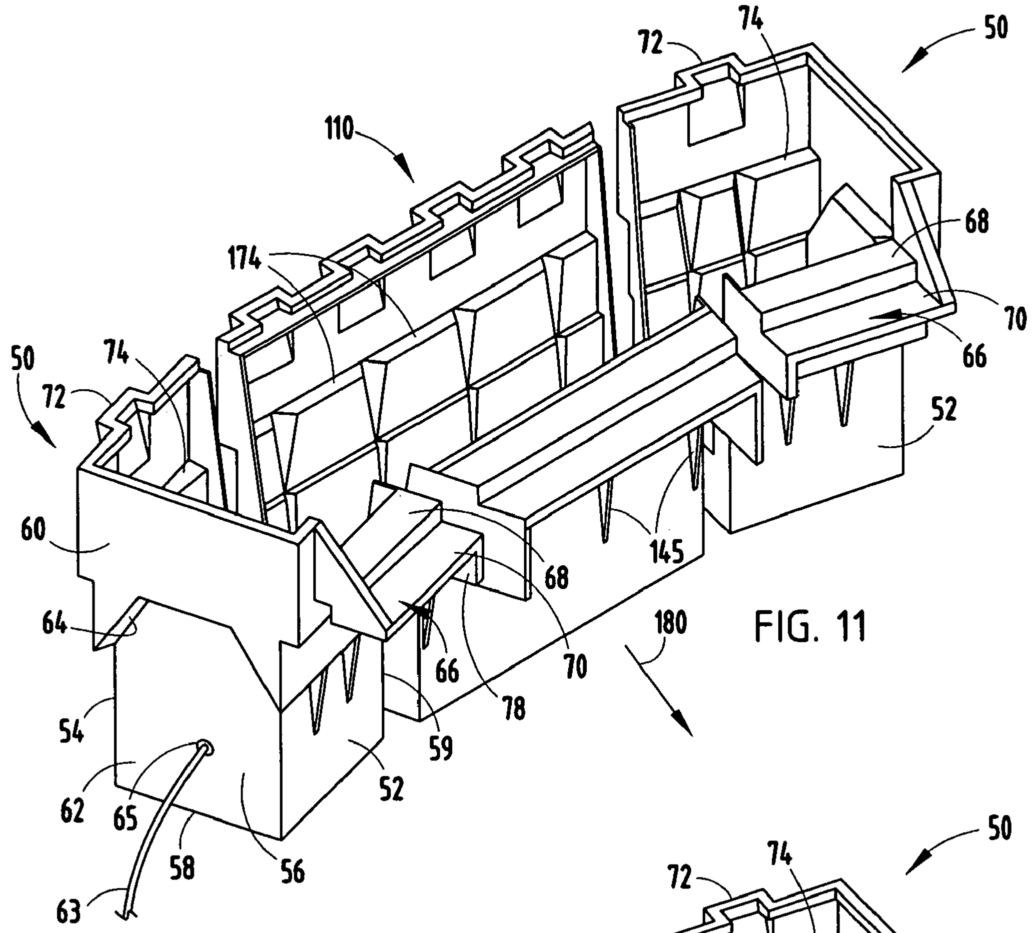
FIG. 11 is a perspective view of the central spillway of FIG. 7 and unattached side spillways.
Figure 12:
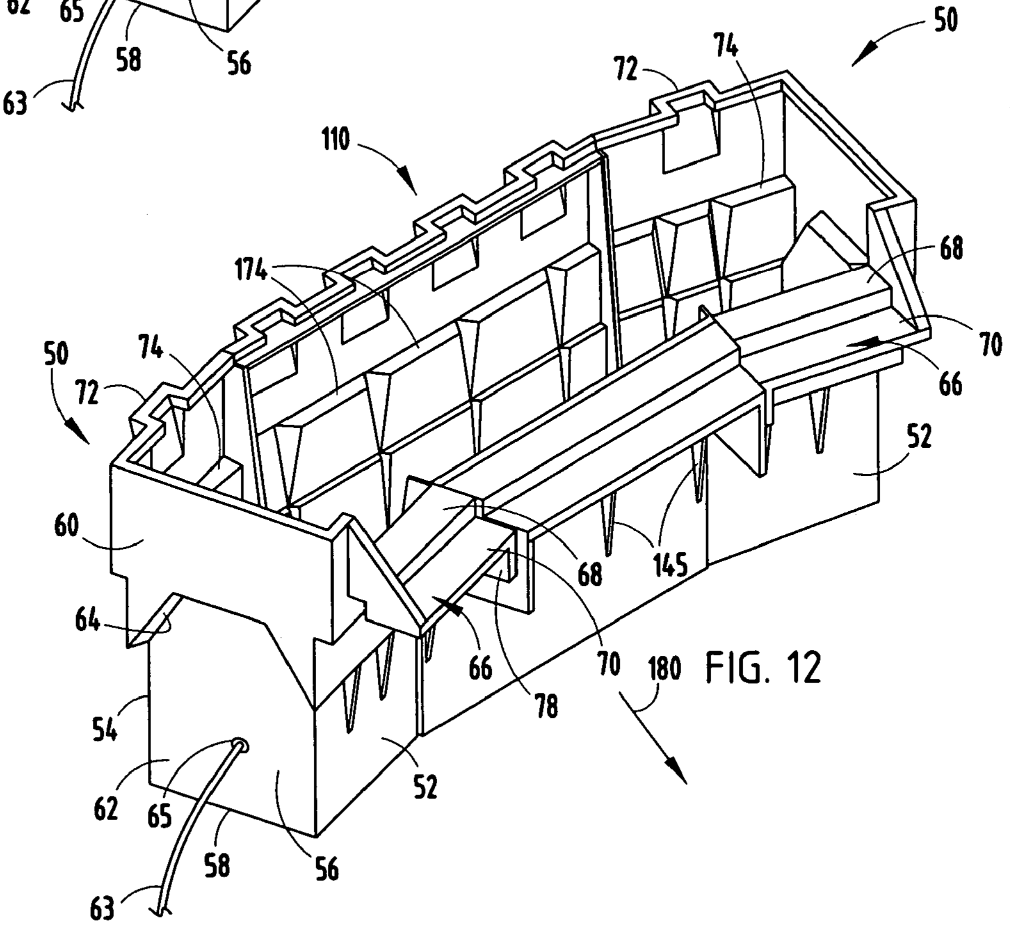
FIG. 12 is a perspective view of the central spillway of FIG. 7 adjacent to side spillways.

FIGS. 7-10 illustrate a second embodiment where the waterfall spillway 110 has a front wall 112 that is narrower in the horizontal plane than the back wall 118. Consequently, the architecture of the waterfall spillway system using waterfall spillway 110 (and optionally side spillways 50) creates a concave waterfall spillway system as shown in FIGS. 11-12 that redistributes a wide water flow to a more centralized, narrower flow as the water flows in the direction of the arrow 180. The spillway 110 otherwise has the same components and general structure as spillway 10 and it is to be understood that those components of the first and second embodiments that have reference numerals with the same last two digits are generally the same. The side spillways 50 are used in both the convex and concave architectures.

A waterfall spillway system can be made by providing a first central spillway on a preconditioned base of aggregate or soil. The first central spillway can have either the construction shown in FIG. 1 where the back wall is narrower and taller than the front wall (waterfall spillway 10), or the construction shown in FIG. 7 where the back wall is wider and taller than the front wall (waterfall spillway 110). At least one side spillway 50 is added thereto matching its open end 59 with an open end of the central spillway. The shelf 66 of the side spillway 50 abuts and compliments the shelf 32 and the central spillway 110. The abutment wall 34 of the first central waterfall spillway 10 is placed alongside the open end 59 of the side spillway 50. The abutment wall 36 of the first central spillway 10 may be placed alongside a second central spillway 10 or another side spillway 50. If a second central spillway 10 is placed alongside the first central spillway 10, the overall length of the waterfall area is increased. If another side spillway 50 is placed alongside the first central spillway 10 on an opposite side from the originally placed side spillway 50, then the waterfall spillway becomes closed. Many central spillways may be placed alongside one another to create a substantially long waterfall spillway. Non-linear concave and convex waterfall spillways, or a combination thereof may be created. Alternatively, straight or linear waterfall spillways may be created from a combination of alternating waterfall spillways 10 with waterfall spillways 110. Regardless of the length, a side spillway 50 may typically be used for each open end of any central spillway 10, 11 where an additional adjacent central spillway 10, 11 has not been placed. If concave waterfall spillways are alternated with convex waterfall spillways, a relatively linearly shaped waterfall spillway system can be created.

Figure 13:
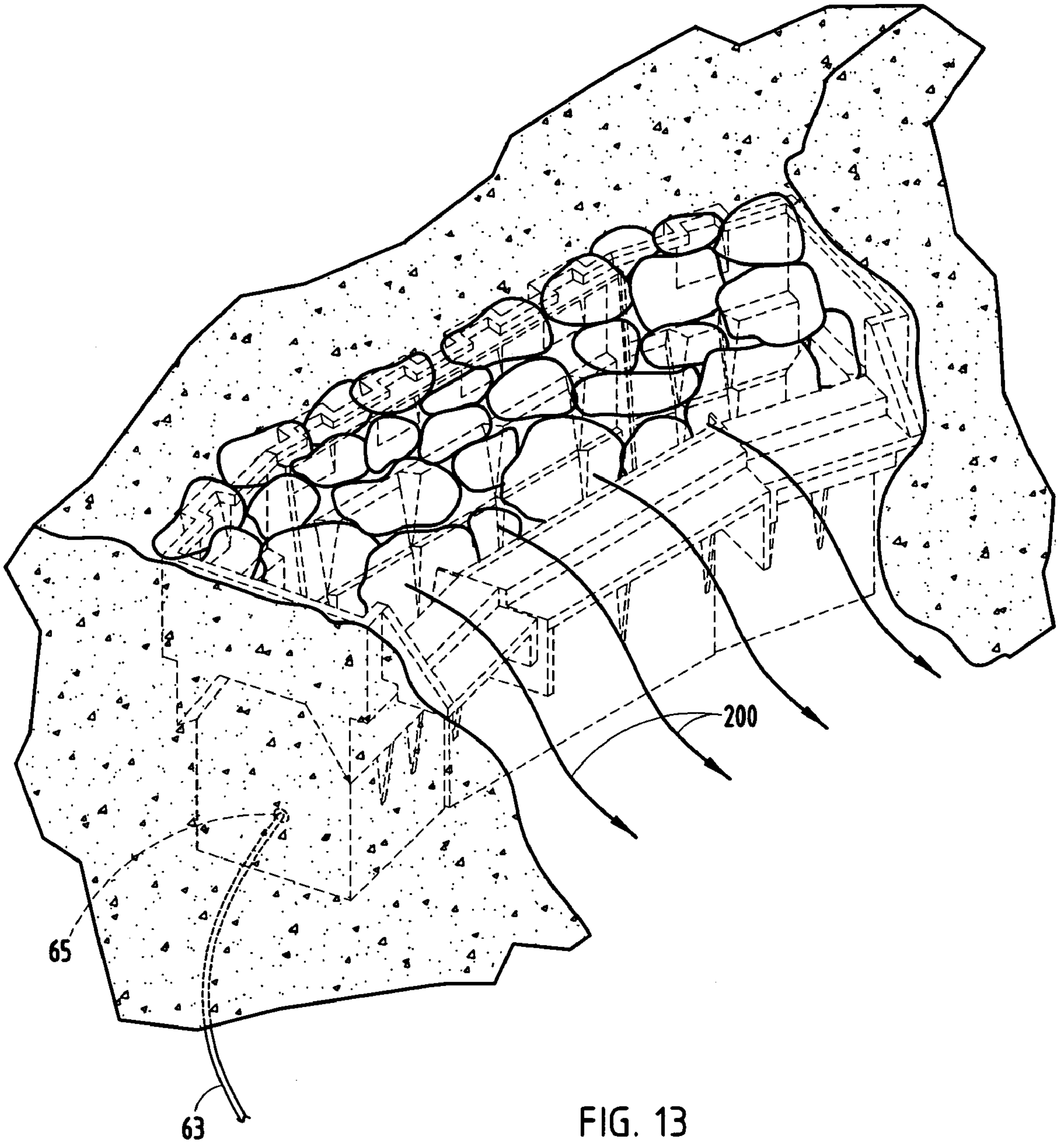
FIG. 13 is a view of the spillway of FIG. 12 showing an example of the surrounding terrain and water flow direction over the spillway.

FIG. 13 illustrates the waterfall spillway system in use. The waterfall spillway is disposed between two soil embankments. Water is supplied by the hose 63 and fills the channel 30 inside the spillway system until water cascades down over the shelf in the direction of arrows 200. The spillway system may have rocks, aggregate, or artificial energy dissipaters in channel 30.

The design of this system creates an aesthetical structurally sound waterfall spillway system. Further, the waterfall spillway is versatile because an infinite number of walls can be added to the core segment, and in addition, the walls can be arranged to form various shapes. Additionally, the improved structure of the spillway lessens the likelihood of the spillway breaking or fracturing from the stresses associated with water flow or forces applied by the surrounding earth.

The above description is considered that of the preferred embodiments only. Modifications of the invention will occur to those skilled in the art and to those who make or use the invention. Therefore, it is understood that the embodiments shown in the drawings and described above is merely for illustrative purposes and not intended to limit the scope of the invention, which is defined by the following claims as interpreted according to the principles of patent law, including the Doctrine of Equivalents.

The invention claimed is:

1. A waterfall spillway comprising:

a front wall having a top portion and a bottom portion and a horizontal width;

a back wall substantially parallel with the front wall and having top, central, and bottom portions wherein the back wall has a horizontal width less than the horizontal width of the front wall;

a base wall connecting the bottom portion of the front wall with the bottom portion of the back wall;

a cavity extending between the front wall and the back wall and first and second open side walls; and a shelf extending from the top portion of the front wall, substantially parallel with the base wall.

2. The waterfall spillway of claim 1, further comprising:

an abutment wall connected to and perpendicular with the front and back walls.

3. The waterfall spillway of claim 1, wherein:

the shelf has an upper piece that extends outwardly from the top portion of the front wall and is substantially parallel with the base wall and a lower piece that extends from an underside of the upper piece.

4. The waterfall spillway of claim 1, further comprising:

protrusions that project from the back wall.

5. The waterfall spillway of claim 4, wherein:

the protrusions project inwardly toward the front wall.

6. The waterfall spillway of claim 4, wherein:

the protrusions project outwardly away from the front wall.

7. The waterfall spillway of claim 1, wherein:

the front wall has longitudinal supports extending from a central portion of the front wall.

8. The waterfall spillway of claim 2, further comprising:

an end component having a connecting wall.

9. The waterfall spillway of claim 8, wherein:

the connecting wall of the end component has a flange coplanar with a flange disposed on the abutment wall.

10. A waterfall spillway system, comprising:

a first central spillway having front, back, and base walls that form a cavity, and a central abutment wall substantially perpendicular to the front, back, and base walls;

a first side spillway having an abutment side wall proximate the central abutment wall of the first central spillway, and an outside wall substantially perpendicular with and connected to the front and back walls of the side spillway, wherein a top portion of the outside wall has a downwardly facing lip.

11. The system of waterfall spillways of claim 10, wherein:

the first central spillway and the first side spillway are arranged in a non-linear configuration.

12. The system of waterfall spillways of claim 10, wherein:

the first central spillway and the first side spillway are arranged in a linear configuration.

13. The system of waterfall spillways of claim 10, wherein:

the first central spillway has a second abutment wall proximate a second central spillway.

14. The system of waterfall spillways of claim 13, wherein:

the first central spillway and the second central spillway are arranged in a non-linear configuration.

15. The system of waterfall spillways of claim 13, wherein:

the first central spillway and the second central spillway are arranged in a linear configuration.

16. A method of making a waterfall spillway system, comprising:

providing a first central spillway having a front wall, a base wall, a back wall, a first end and a second end, wherein the front wall has a shelf projecting outwardly away from the back wall;

providing a first side spillway having a front wall, a base wall, a back wall, an open end and a containment end, wherein the front wall has a shelf projecting outwardly away from the back wall; and placing the first end of the first central spillway alongside the open end of the first side spillway.

17. A waterfall spillway comprising:

a front wall having a top portion and a bottom portion and a horizontal width;

a back wall substantially parallel with the front wall and having top, central, and bottom portions wherein the back wall has a horizontal width greater than the horizontal width of the front wall;

a base wall connecting the bottom portion of the front wall with the bottom portion of the back wall;

a cavity extending between the front wall and the back wall and first and second open side walls; and a shelf extending from the top portion of the front wall, substantially parallel with the base wall.

18. The waterfall spillway of claim 17, further comprising:

an abutment wall connected to and perpendicular with the front and back walls.

19. The waterfall spillway of claim 17, wherein:

the shelf has an upper piece that extends outwardly from the top portion of the front wall and is substantially parallel with the base wall and a lower piece that extends from an underside of the upper piece.

20. The waterfall spillway of claim 17, further comprising:

protrusions that project from the back wall.

21. The waterfall spillway of claim 20, wherein:

the protrusions project inwardly toward the front wall.

22. The waterfall spillway of claim 20, wherein:

the protrusions project outwardly away from the front wall.

23. The waterfall spillway of claim 17, wherein:

the front wall has longitudinal supports extending from a central portion of the front wall.

24. The waterfall spillway of claim 18, further comprising:

an end component having a connecting wall.

25. The waterfall spillway of claim 24, wherein:

the connecting wall of the end component has a flange coplanar with a flange disposed on the abutment wall.

* * * * *